United States Patent
Zebuhr

(10) Patent No.: US 8,100,171 B2
(45) Date of Patent: Jan. 24, 2012

(54) HEAT-EXCHANGER SEALING

(75) Inventor: William H. Zebuhr, Nashua, NH (US)

(73) Assignee: ZanAqua Technologies, Inc., Nashua, NH (US)

( * ) Notice: Subject to any disclaimer, the term of this patent is extended or adjusted under 35 U.S.C. 154(b) by 518 days.

(21) Appl. No.: 12/077,116

(22) Filed: Mar. 17, 2008

(65) Prior Publication Data

US 2009/0229804 A1 Sep. 17, 2009

(51) Int. Cl.
*F28D 7/00* (2006.01)
(52) U.S. Cl. .................................................... 165/164
(58) Field of Classification Search .......... 165/164, 165/165

See application file for complete search history.

(56) References Cited

U.S. PATENT DOCUMENTS

| | | | | |
|---|---|---|---|---|
| 326,839 | A | * | 9/1885 | Braithwaite et al. .......... 165/166 |
| 2,019,351 | A | * | 10/1935 | Lathrop ........................ 165/165 |
| 3,640,340 | A | * | 2/1972 | Leonard et al. ............... 165/166 |
| 4,043,388 | A | * | 8/1977 | Zebuhr ......................... 165/166 |
| 4,635,715 | A | | 1/1987 | Andersson |
| 5,462,113 | A | * | 10/1995 | Wand ............................ 165/167 |
| 5,486,010 | A | | 1/1996 | Hamilton et al. |
| 5,567,493 | A | | 10/1996 | Imai et al. |
| 7,112,297 | B2 | | 9/2006 | Williams et al. |
| 7,150,099 | B2 | * | 12/2006 | Whittenberger et al. ..... 165/165 |
| 2006/0048926 | A1 | | 3/2006 | Richter |

OTHER PUBLICATIONS

International Search Report and Written Opinion for PCT/US2009/036777.

* cited by examiner

*Primary Examiner* — Teresa Walberg
(74) *Attorney, Agent, or Firm* — Rajesh Vallabh; Foley Hoag LLP

(57) ABSTRACT

A distiller's counterflow-heat-exchanger module includes thermally conductive distillate and concentrate dividers across which heat flows to an influent liquid from distillate and concentrate liquids, respectively. The distillate divider's shape is convoluted in such a manner as to form alternating distillate and influent channels having end openings. A peripheral gasket is so over-molded onto the distillate divider that it forms plugs that seal the end openings from each other and further forms a ridge providing surfaces against which opposed generally planar parallel surfaces of cover members can be urged to form a peripheral seal.

15 Claims, 13 Drawing Sheets

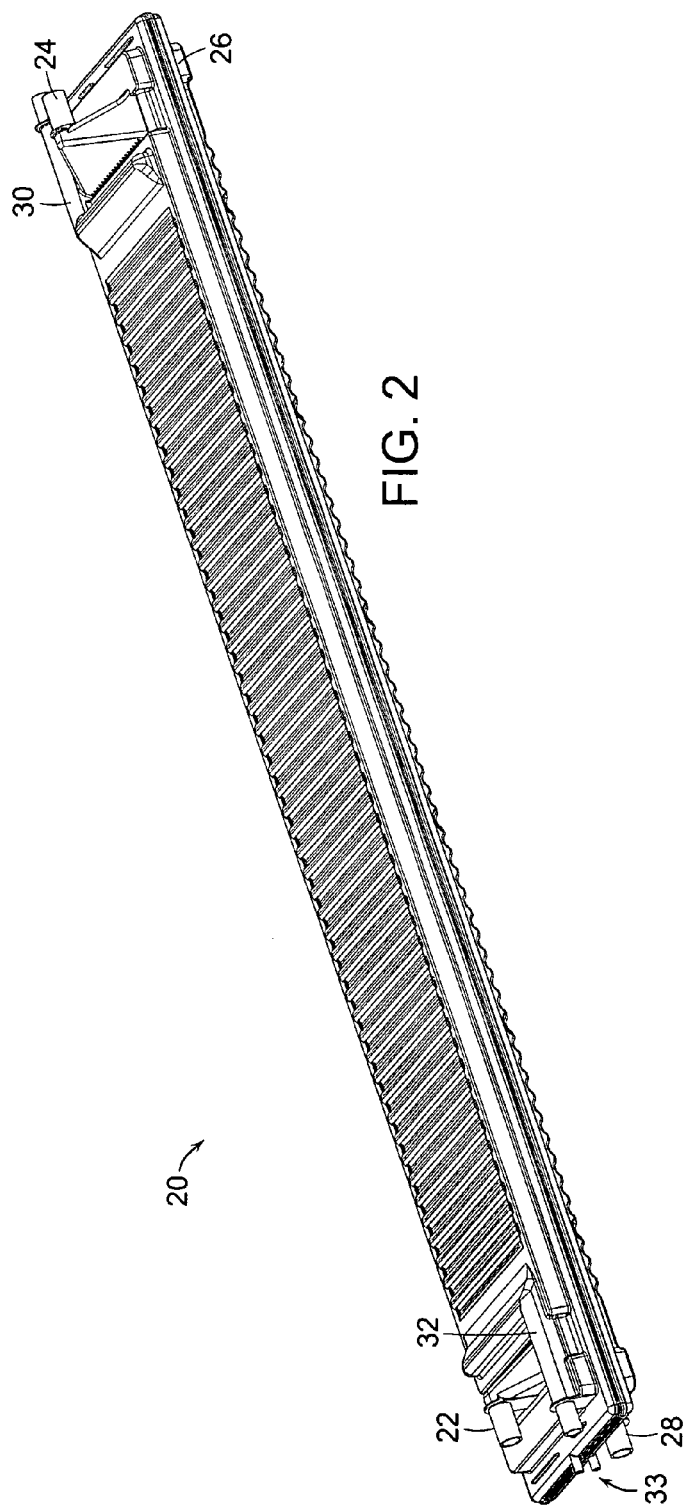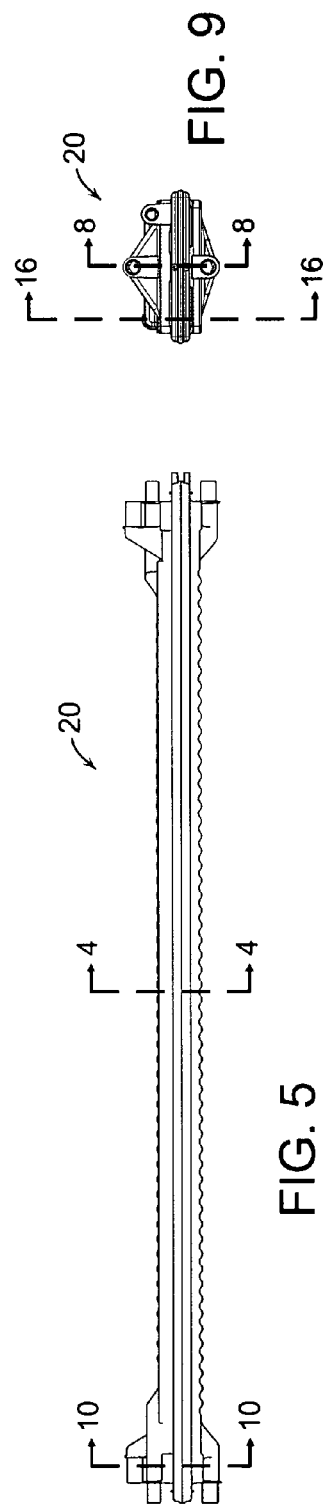

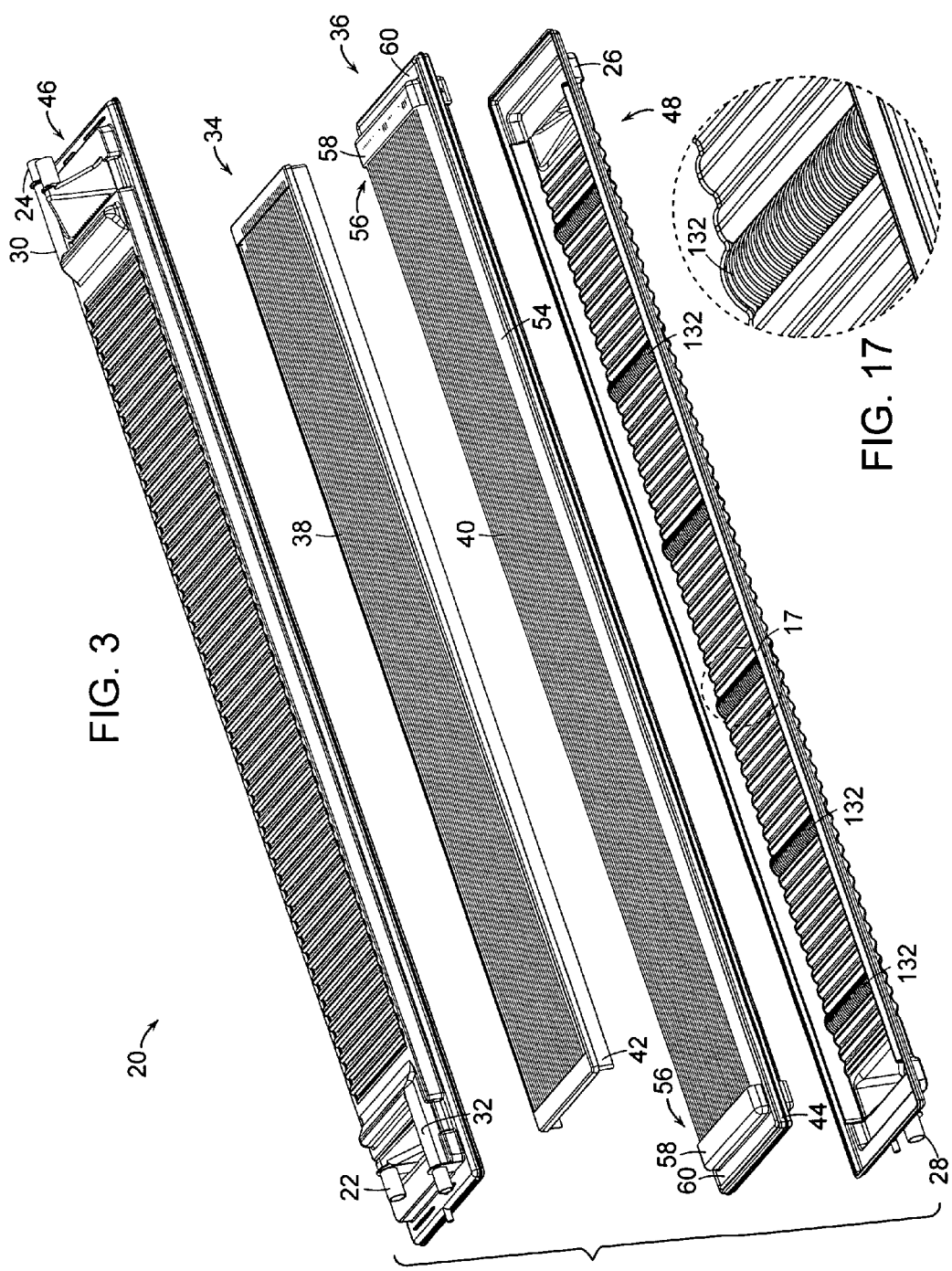

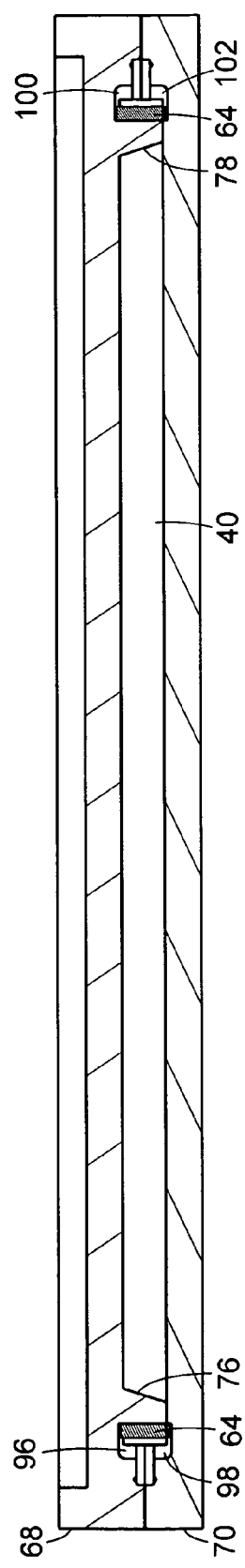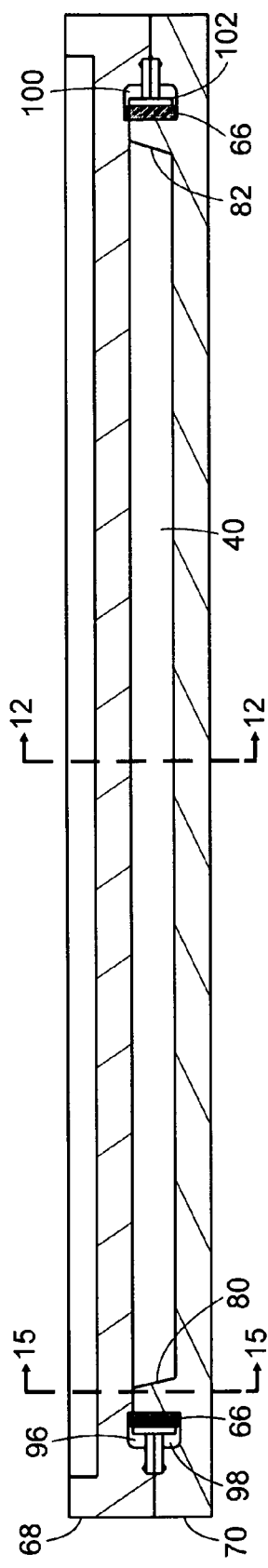

HEAT-EXCHANGER SEALING

BACKGROUND OF THE INVENTION

1. Field of the Invention

The present invention concerns counterflow heat exchangers and finds particular application in those that are components of mass-produced distillers.

2. Background Information

Distillation is probably the single most effective approach to purifying water. But it has historically been too costly for widespread use. Distillation requires that the water evaporate. Without energy recovery, the energy of vaporization alone would cost something on the order of fifteen to twenty cents per gallon or more. Theoretically, that cost can be reduced by recovering and reusing the heat of vaporization. For most small-scale distillation applications, though, the equipment available until now has not had the capability of recovering enough heat to make distillation affordable.

But more-recent designs have shown that small, low-component-cost distillers can distill water with high efficiency. For example, a fire-plug-sized distiller based on U.S. patent application Ser. No. 10/870,018 of William H. Zebuhr for a Blade Heat Exchanger has been constructed that can produce distilled water at an operating cost of less than half a cent per gallon.

In that design, the influent to be purified is heated to near its saturation temperature and sprayed onto heat-exchange surfaces in the evaporation chamber of a rotary heat exchanger. Such a heat exchanger uses centrifugal force to keep the liquid film on its heat-exchange surfaces much thinner than surface tension would ordinarily permit. As a consequence, those surfaces transfer heat of vaporization to the influent very efficiently.

A compressor draws the resultant vapor from the evaporation chamber, leaving contaminants behind. The compressor raises the vapor's pressure and delivers the higher-pressure (and thus higher-saturation-temperature) vapor to the rotary heat exchanger's condensation chamber. In that chamber, thermal communication with the evaporation chamber results in the vapor's condensing into a largely contaminant-free distillate, surrendering its heat of vaporization in the process to the influent in the evaporation chamber. The rotary heat exchanger thereby recovers the heat of vaporization efficiently.

Such a system also needs to recover the heat that raised the influent to the temperature at which it is delivered to the rotary heat exchanger, and this can be achieved readily in a counterflow heat exchanger. In such a heat exchanger the condensed but still high-temperature distillate is cooled by being brought into thermal communication with the incoming influent across thermally conductive dividers. In the process the distillate heats the influent nearly to the desired evaporation-chamber temperature. (Further heat increase is typically accomplished by, e.g., using the influent to cool the compressor motor.)

As was stated above, such a distiller can be made small, so it has the potential to be manufactured inexpensively. But achieving that potential requires that the distiller's components be assembled with speed and simplicity. And a problem that arises in this connection is how to seal the counterflow heat exchanger's thermally conductive dividers.

Sealing is a problem because the divider's area should be relatively high in comparison with the area of the counterflow heat exchanger's other conduit-defining surfaces (which contribute to cost and undesired heat transfer). The high-surface-area requirement dictates that the divider be convoluted rather than flat. In one design, for example, the divider results from folding a flat sheet multiple times in such a manner that each fold cooperates with its neighbor folds to define longitudinally extending influent and distillate channels. A consequence of such a design is that, instead of having a flat sheet's basically one-dimensional cross section, the divider cross section undulates, forming alternating end openings for adjacent channels. The welding, soldering, and other approaches conventionally used to seal such end opening would add significantly to a small distiller's cost of production.

SUMMARY OF THE INVENTION

But I have found a way to reduce this cost significantly. To seal the divider to opposed counterflow-heat-exchanger cover members, I use a gasket so shaped as both to plug the divider's end openings and to form a sealing ridge with which complementary, substantially parallel sealing surfaces on the cover members can mate. Preferably, the gasket is provided by over-molding. That is, the divider is placed in a mold, and material that cures into rubber or some other deformable material is injected into the mold to mold the gasket onto the divider. In short, simple injection molding replaces laborious soldering or welding.

Additionally, I have found a way to facilitate over-molding such a gasket. To prevent the molten gasket material from flowing farther than desired down the channels that the divider's folds create, those channels need to be plugged by teeth of some sort that extend into those channels, and the mold's interior surface may be shaped to form such teeth. But it turns out that the gasket material tends to stick to the teeth, so extracting the resultant divider-and-gasket assembly from such a mold can present difficulties that add greatly to fabrication cost. I have discovered, however, that this difficulty and expense can be avoided by providing teeth on comb members that are separate from the mold and remain as part of the resultant divider-and-gasket assembly after molding.

My preferred approach is still to use a mold that forms teeth. Before the divider is placed into the mold, these comb members are so placed onto the divider that their teeth fit into the channels. When the resultant assembly is placed into the mold, the mold teeth butt up against the comb teeth, and that the comb members act as barriers between the gasket material and the mold teeth. Since the comb members serve as the primary interface with the gasket material in the channels and remain as part of the divider-and-gasket assembly when that assembly is extracted after molding, that extraction is much easier than it would be if the gasket material impinged against the mold teeth directly. Preferably, the comb members are deformable so that the gasket material injected into the mold cavity so squeezes the comb member as to deform its teeth into effective sealing shapes. This reduces the need for tight tolerances.

BRIEF DESCRIPTION OF THE DRAWINGS

FIG. 2 is a more-detailed isometric view of one of the FIG. 1 distiller's counter-flow-heat-exchanger modules.

FIG. 3 is an exploded view of the FIG. 2 heat-exchanger module.

FIG. 5 is a side elevation of the heat-exchanger module.

FIG. 9 is an end elevation of the heat-exchanger module.

FIG. 13 is a cross-sectional view of the mold-and-divider assembly taken at line 13-13 of FIG. 12.

FIG. 14 is a cross-sectional view of the mold-and-divider assembly taken at line 14-14 of FIG. 12.

FIG. 17 is a detail of FIG. 3 showing the heat-exchange module's lower cover plate's spacers in more detail.

DETAILED DESCRIPTION OF AN ILLUSTRATIVE EMBODIMENT

Figure 1:
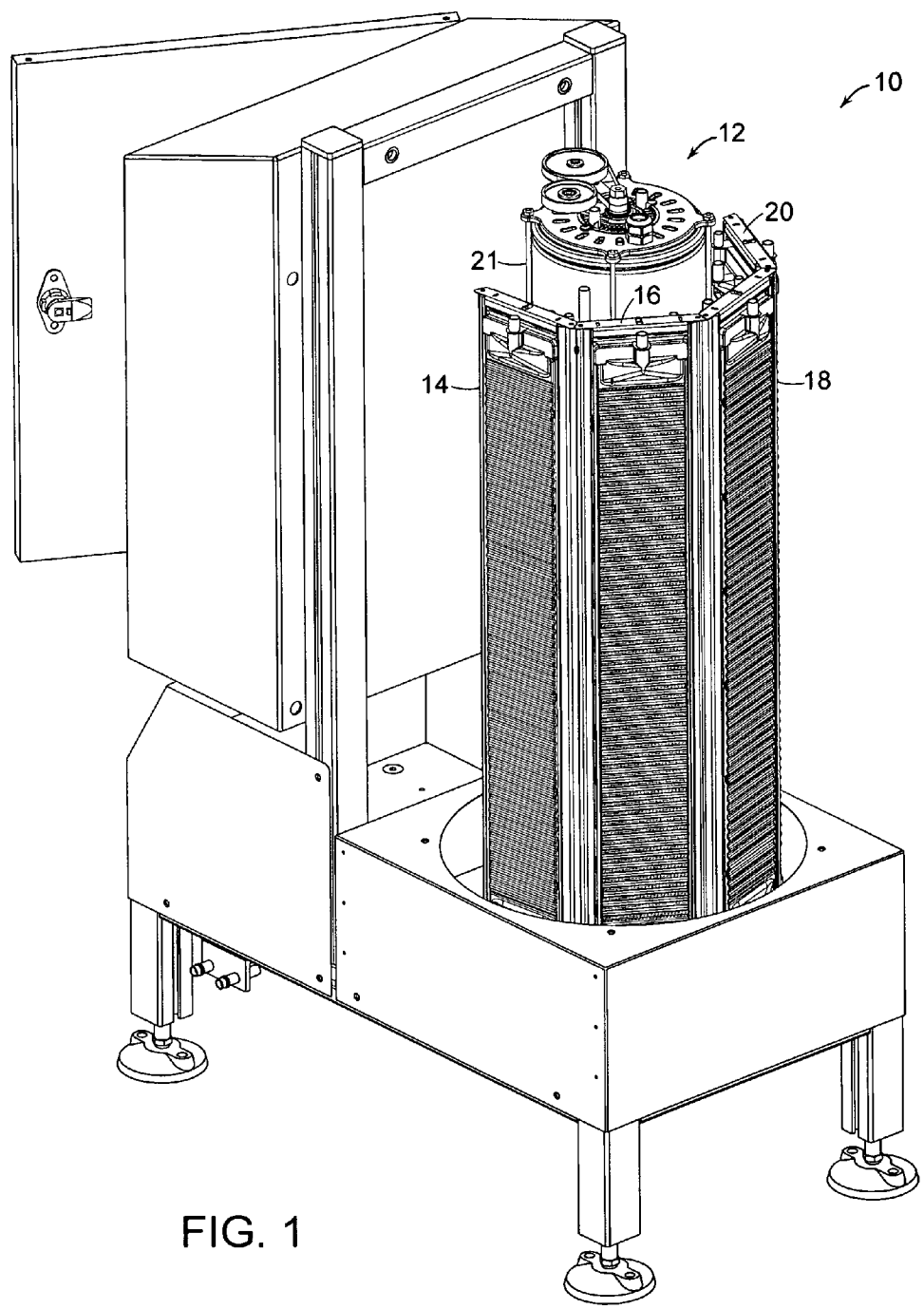
FIG. 1 is an isometric view of a vapor-compression distiller with its insulating housing removed.

FIG. 1 depicts a distiller 10 in which rotary heat exchanger 12 produces purified distillate from contaminated influent and rejects the contaminates in a concentrate. A counterflow heat exchanger comprising four identical modules 14, 16, 18, and 20 operating in series receives the distillate and concentrate from the rotary heat exchanger 12 and transfers heat from them to the influent, which the counterflow heat exchanger then supplies to the rotary heat exchanger.

Specifically, influent that the distiller receives at an influent port not shown is pumped in one direction through the counterflow-heat-exchanger modules 14, 16, 18, and 20, where the influent absorbs heat from distillate and concentrate that flow through those modules in the opposite direction. Because of the opposite-direction flow, the influent is placed in thermal communication with increasingly hot distillate and concentrate as it advances through the counterflow heat exchanger and itself becomes hotter: the temperature difference across the heat-transferring dividers between the counterflow heat exchanger's influent passage and its distillate and concentrate passages does not vary much with distance along the fluid path even though the influent's temperature does.

The influent thus heated enters the rotary heat exchanger 12's evaporation chamber, where it receives enough further heat to cause most of its water to evaporate. A compressor 21 raises the resultant vapor's pressure and delivers the higher-pressure (and thus higher-saturation-temperature) vapor to the rotary heat exchanger 12's condensation chamber. In that chamber, thermal communication with the evaporation chamber results in the vapor's condensing into the distillate and surrendering its heat of vaporization to the influent in the evaporation chamber. The resultant distillate enters the counterflow heat exchanger 14, 16, 18, and 20 to heat the incoming influent, as was explained above. The distillate is thereby cooled before it issues from the system's distillate port (not shown).

Not all of the influent that enters the evaporation chamber evaporates and flows to the condensation chamber. A minor portion, which contains contaminants that the vapor left behind when it was drawn out of the evaporation chamber, is drained from that chamber. This is the concentrate that cooperates with the distillate to heat the influent in the counterflow heat exchanger. The concentrate leaves the system through a concentrate port not shown in the drawings.

The remaining drawings depict specific counterflow-heat-exchanger elements by which the above-outlined heat transfers occur. As FIG. 2 shows, representative counter-flow-heat-exchanger module 20 includes an influent inlet port 22 through which relatively cool influent enters. As will be explained in more detail below, the influent flows through the heat-exchanger module 20 and out an influent outlet port 24. In doing so, it is heated by the distillate, which enters through another inlet port 26 and leaves through another outlet port 28, and by the concentrate, which enters through yet another inlet port 30 and leaves through a corresponding outlet port 32.

FIG. 3, which is an exploded view of heat-exchanger module 20, shows that it includes two heat-transfer assemblies 34 and 36. Assemblies 34 and 36 include respective dividers 38 and 40 made of 0.25-mm-thick stainless steel. They also include respective gaskets 42 and 44 that, as will be explained further in due course, have been over-molded onto those dividers' peripheries. In the illustrated embodiment those gaskets are made of ethylene propylene diene monomer rubber. The gaskets do not have to be made of that material; silicone rubber, for instance, could be used instead. But the gasket material should be deformable, and I prefer an elastomer, preferably one with a Shore A durometer hardness between 60 and 80. The gaskets and the surfaces of the dividers 38 and 40 that face each other form between the heat-transfer assemblies 34 and 36 the influent conduit through which the influent flows from port 22 to port 24.

A first, upper (in FIG. 3) plastic cover plate 46 forms the influent and concentrate inlets 22 and 30 and outlets 24 and 32 and cooperates with the upper divider 38's other, upward-facing surface and that divider's gasket 42 to define a conduit by which concentrate flows between the concentrate ports 30 and 32. (For the sake of convenience we use upper and lower, as well as vertical and horizontal, in accordance with the orientation of FIG. 2. But this terminology is literally correct only in the context of FIGS. 2-17; in distiller 10's normal, FIG. 1 orientation, the "horizontal" plane would actually be oriented vertically.) By flowing through the conduit from port 30 to port 32, the concentrate surrenders heat through the upper divider 38 to the influent.

Now, some embodiments may omit the concentrate conduit, because the amount of heat the influent receives from the concentrate is relatively small; most of the heat the counterflow heat exchanger imparts to the influent comes from the distillate. That heat is transferred from the distillate as the distillate flows from port 26 to port 28 through a conduit defined by the lower divider 40, the lower gasket 44, and a lower plastic cover plate 48, which also forms the distillate inlet 26 and outlet 28.

Figure 4:
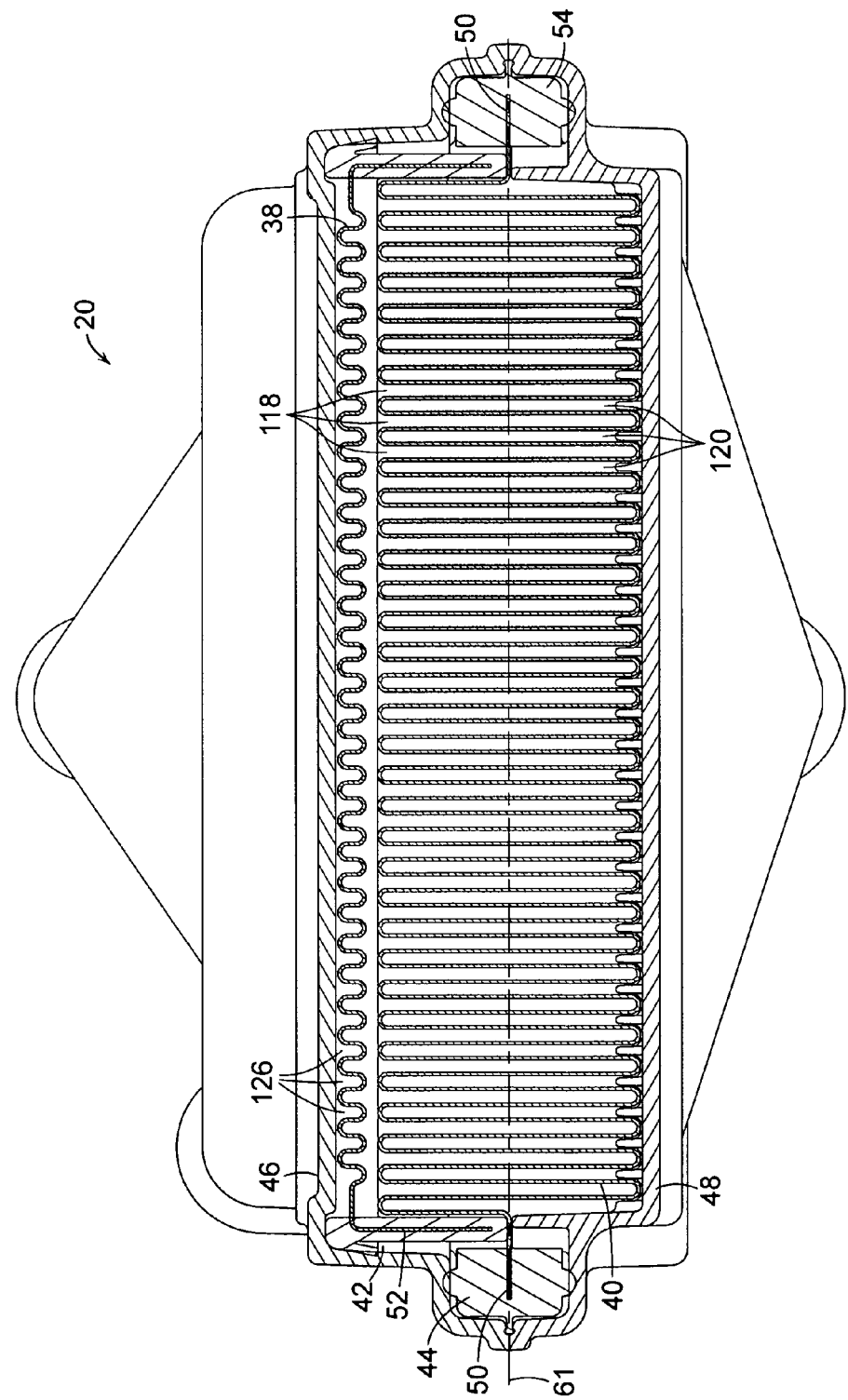
FIG. 4 is a cross-sectional view of the heat-exchanger module taken at line 4-4 of FIG. 5.

FIG. 4 is a cross section taken at line 4-4 of FIG. 5, which in turn is a side elevation of heat-exchanger module 20. FIG. 4 shows that the lower divider 40, which is 61 cm long in the illustrated embodiment, is bent into longitudinal folds. After folding, that divider is 7.6 cm wide and 1.9 cm high. Each fold defines with one of its neighbor folds one of a plurality of longitudinally extending channels through which the influent flows in parallel. With its other neighbor fold it similarly defines a constituent of the distillate conduit, so it conducts heat from the distillate conduit to the influent conduit. In total, the lower divider exposes 0.75 m$^2$ of heat-transfer surface both to the influent side and to the distillate side. And the divider is so convoluted that this area is over 90% of the distillate conduit's surface area. While not all embodiments' dividers will be so convoluted, most will be convoluted enough to provide at least 80% of the distillate conduit's area. The thermal conductivity of the stainless steel used in the illustrated embodiment for the lower divider 40 is 16.2 W/m-K, so divider 40 conducts 48.6 kW/K. That high a thermal conductivity is not essential, but the thermal conductivity of the material used for this purpose should be at least 2 W/m-K, and preferably more than 10 W/m-K.

The upper divider 38 is made of the same-conductivity stainless steel, and it, too, is folded to define longitudinally extending influent channels. But instead of additionally defining distillate channels, its folds define concentrate channels. For reasons that will become apparent, the upper divider 38 is not as long as the lower divider 40, although it is slightly wider. Also, whereas the lower divider 40 forms horizontally extending longitudinal flanges 50, the upper divider 38 forms downward-extending longitudinal skirts 52. If those skirts are ignored, the folded divider is only 0.08 in. (0.203 cm) high after folding, and it provides only 0.1 m² of heat-transfer surface, so it conducts only 9.72 kW/K.

Although the module can be used throughout a wide range of flow rates, it was designed for an influent rate of about 0.5 GPM (32 ml./sec.), with distillate and concentrate rates that respectively are about 90% and 10% of the influent rate. At these flow rates, four such modules connected in series raise the influent temperature by about 90% of the temperature difference between the influent and distillate inlet temperatures.

The distiller of FIG. 1 is preferably so designed that its pumps keep the distillate conduit's pressure higher than the other conduits'. Any minor leaks that occur in embodiments where such a pressure difference prevails result in flow only from the distillate conduit to the influent or concentrate conduit, not into the distillate conduit: minor leaks will not allow the influent or concentrate to contaminate the distillate. Still, it is important for the module to be so sealed as to prevent such leaks. It is particularly important that the distillate conduit, which is located below the lower divider 40, be isolated from the influent conduit, which is disposed on that divider's other side. In a mass-produced device, providing such sealing can be difficult.

Figure 6:
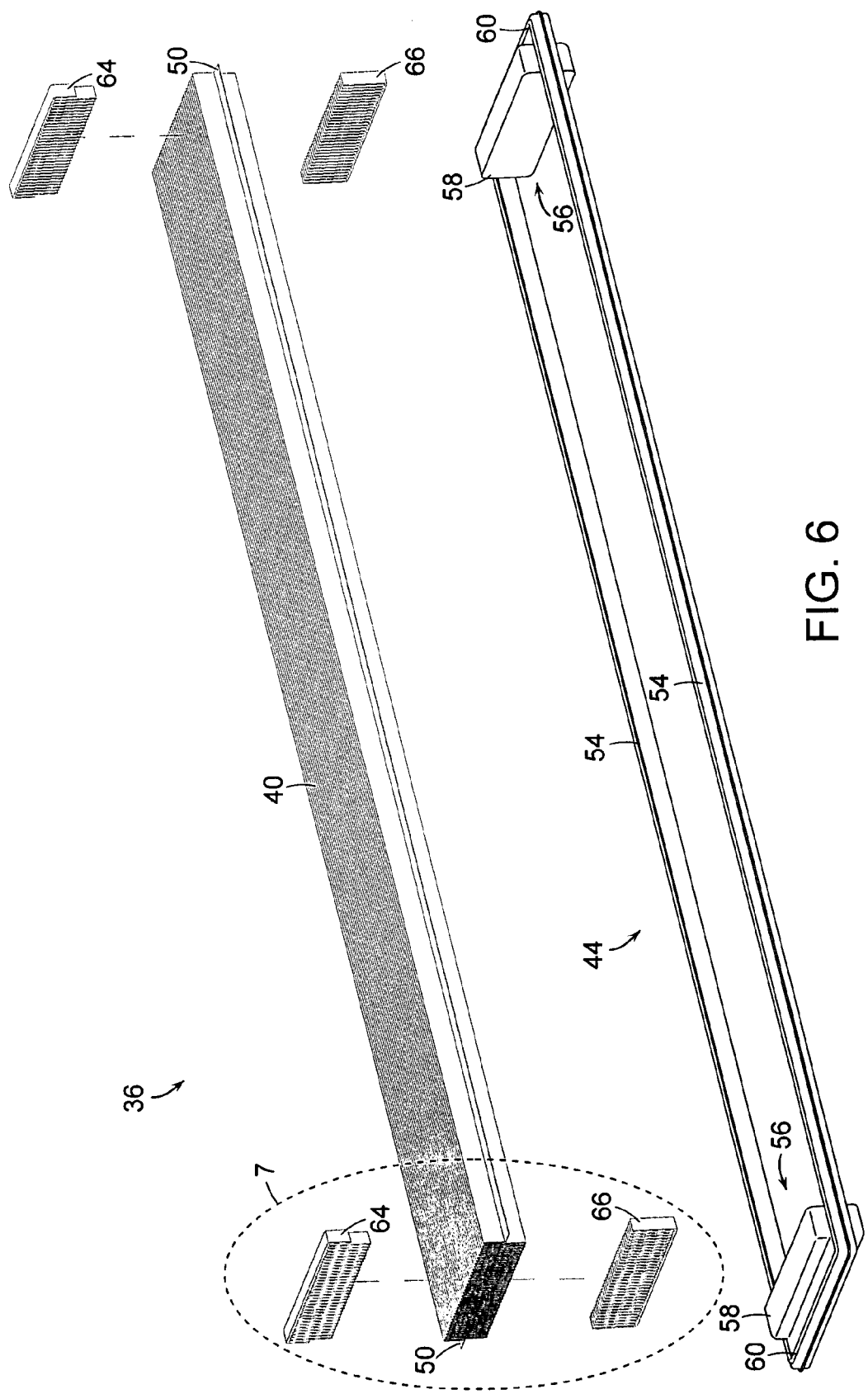
FIG. 6 is an exploded view of the heat-exchanger module's lower heat-transfer assembly.
Figure 7:
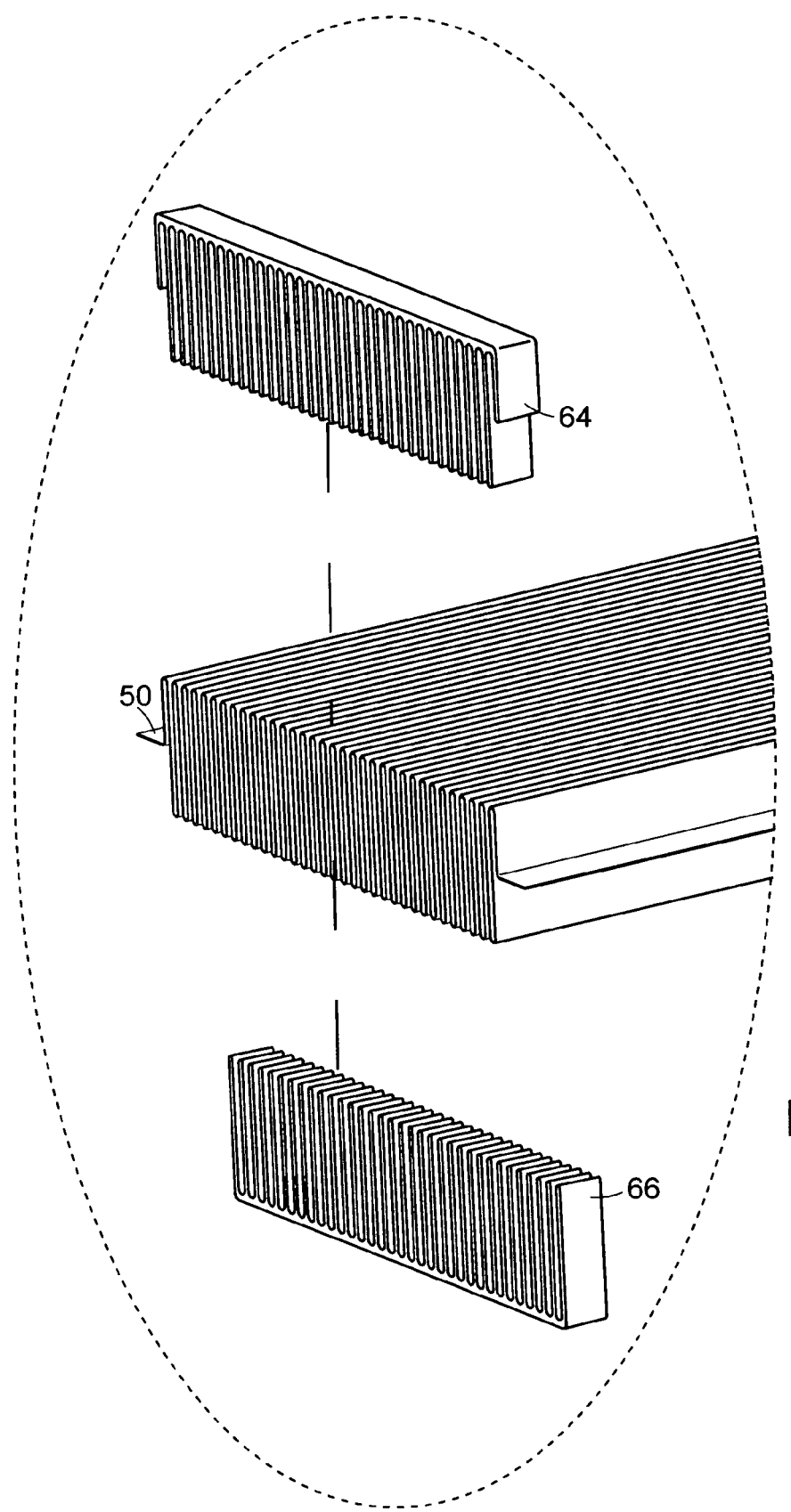
FIG. 7 is a magnified view of FIG. 6's portion 7.

This difficulty can be appreciated by reference to FIG. 6, which is an exploded view of the lower heat-transfer assembly 36. As was explained above, that assembly's divider 40 separates the influent space from the distillate space. That divider must therefore be sealed both along its longitudinally extending sides and along its ends. But each of those ends, of which FIG. 7 shows one in detail, presents a vertical face having alternate influent- and distillate-channel openings, and in a high-volume-production context sealing those openings from each other at an end whose shape is so convoluted presents a problem. For example, it turns out that sealing those openings by welding or soldering them closed not only is expensive but also leaves the need for further sealing, such as between the resultant face and something like a cover end wall. It also turns out that most proposed ways of performing such sealing require tight tolerances.

I have eliminated most such difficulties by over-molding the end seal with a shape that provides a ridge for sealing in a horizontal plane. As will be described in more detail below, that is, I place the lower divider 40 inside a mold that is then used to form gasket 44 about the divider's edges in a shape that FIG. 6 illustrates. Gasket 44 includes side rails 54 that the molding process so forms on flanges 50 as to envelop them in a manner best seen in FIG. 4.

Figure 8:
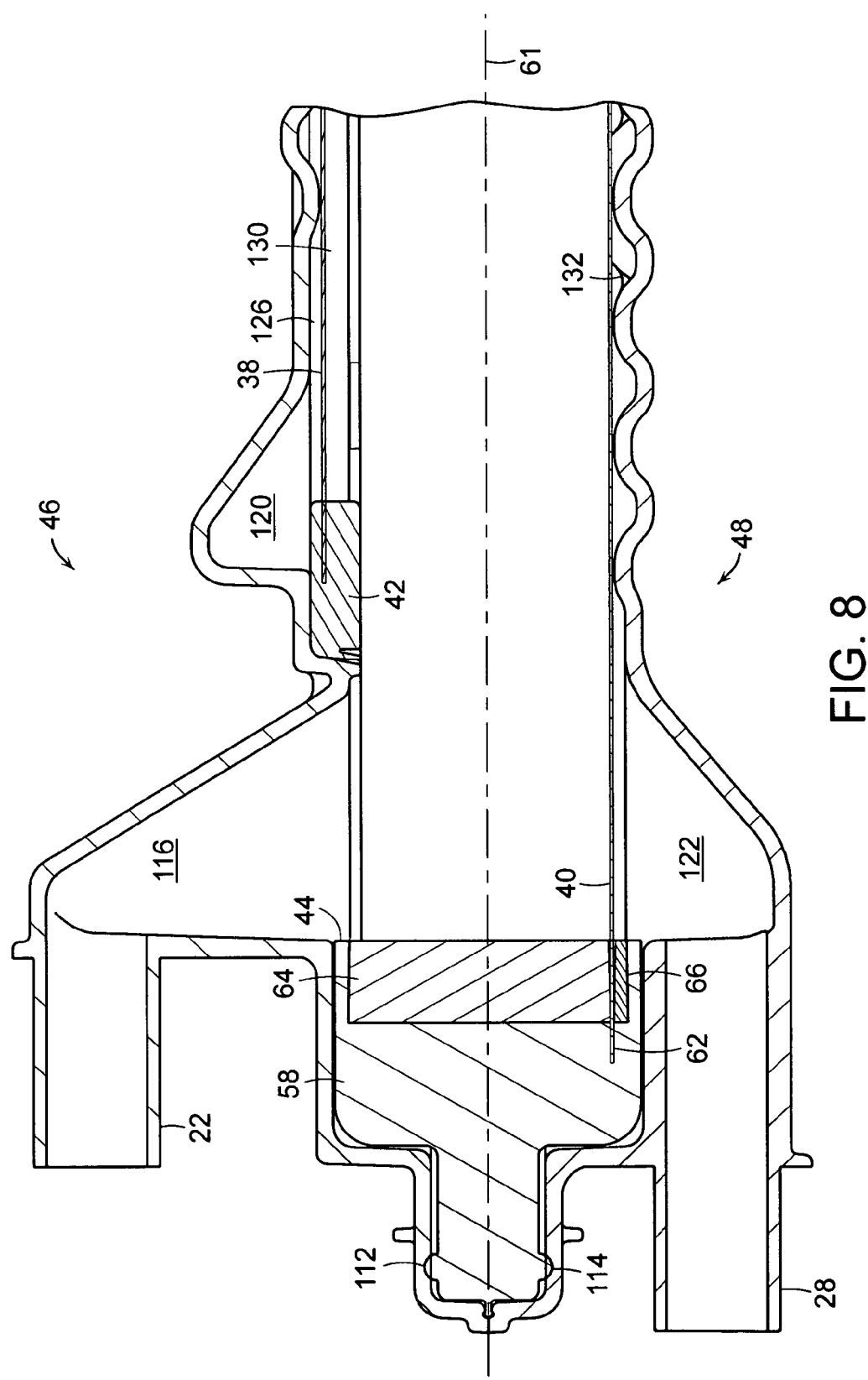
FIG. 8 is a detail of a cross-sectional view of the heat-exchanger module taken line 8-8 of FIG. 9.
Figure 10:
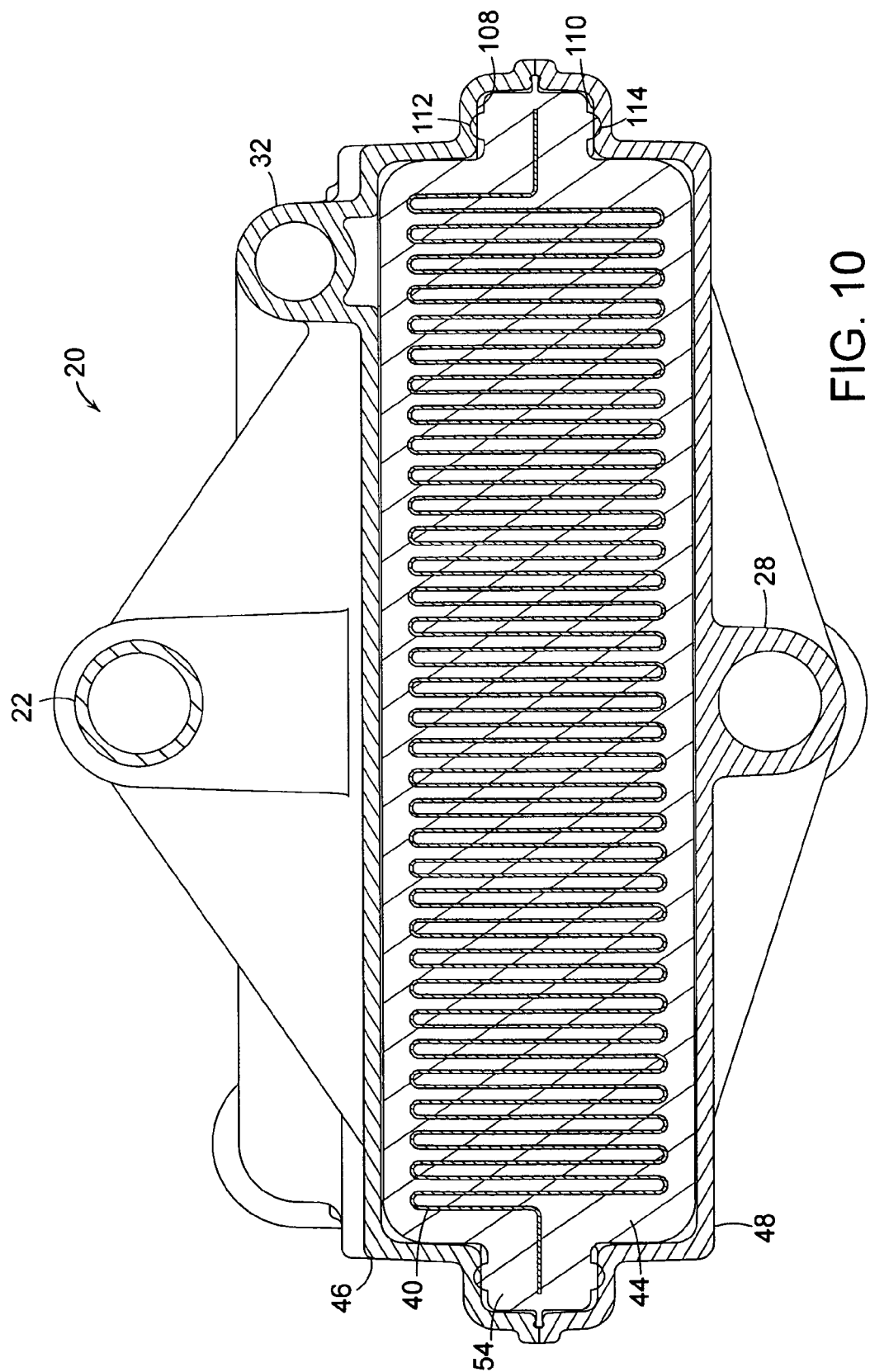
FIG. 10 is a cross-sectional view of the heat-exchanger module taken at line 10-10 of FIG. 5.

FIG. 6 further shows that gasket 44 additionally includes end portions 56, each of which has a thickened, plug region 58 as well as an end flange 60. The end flanges 60 cooperate with the side rails 54 to form a unitary peripheral ridge that lies in what we will refer to as a "sealing plane," which FIG. 4 uses reference numeral 61 to identify. Corresponding peripheral seal surfaces of the top and bottom covers 46 and 48 (seen in FIG. 3) respectively bear against that ridge's upper and lower surfaces. As can be seen in FIG. 8, which is a cross-sectional view taken at line 8-8 of FIG. 9, the plug region 58 is formed on the lower divider 40's end face. That face is evidenced in FIG. 8 only by the bottom 62 of one of the influent conduit's constituent channels, but it can be seen better in FIG. 10, which is a cross section taken at line 10-10 of FIG. 5 through the seal's plug region identified in FIG. 8 by reference numeral 58. FIG. 10 shows divider 40's undulating end face embedded in the plug region, which has been over-molded onto it.

FIG. 8 additionally shows that the plug region 58 is molded also onto combs 64 and 66, which are best seen in FIG. 7. These combs are not essential, but they do aid significantly in constructing the lower heat-transfer assembly 36. For one thing, they help maintain the 0.25-mm-thick lower divider 40's shape. As will now be explained, more-over, they facilitate the molding process and minimize flashing that might otherwise form on gasket 44's plug region 58 when that region is being molded.

Figure 11:
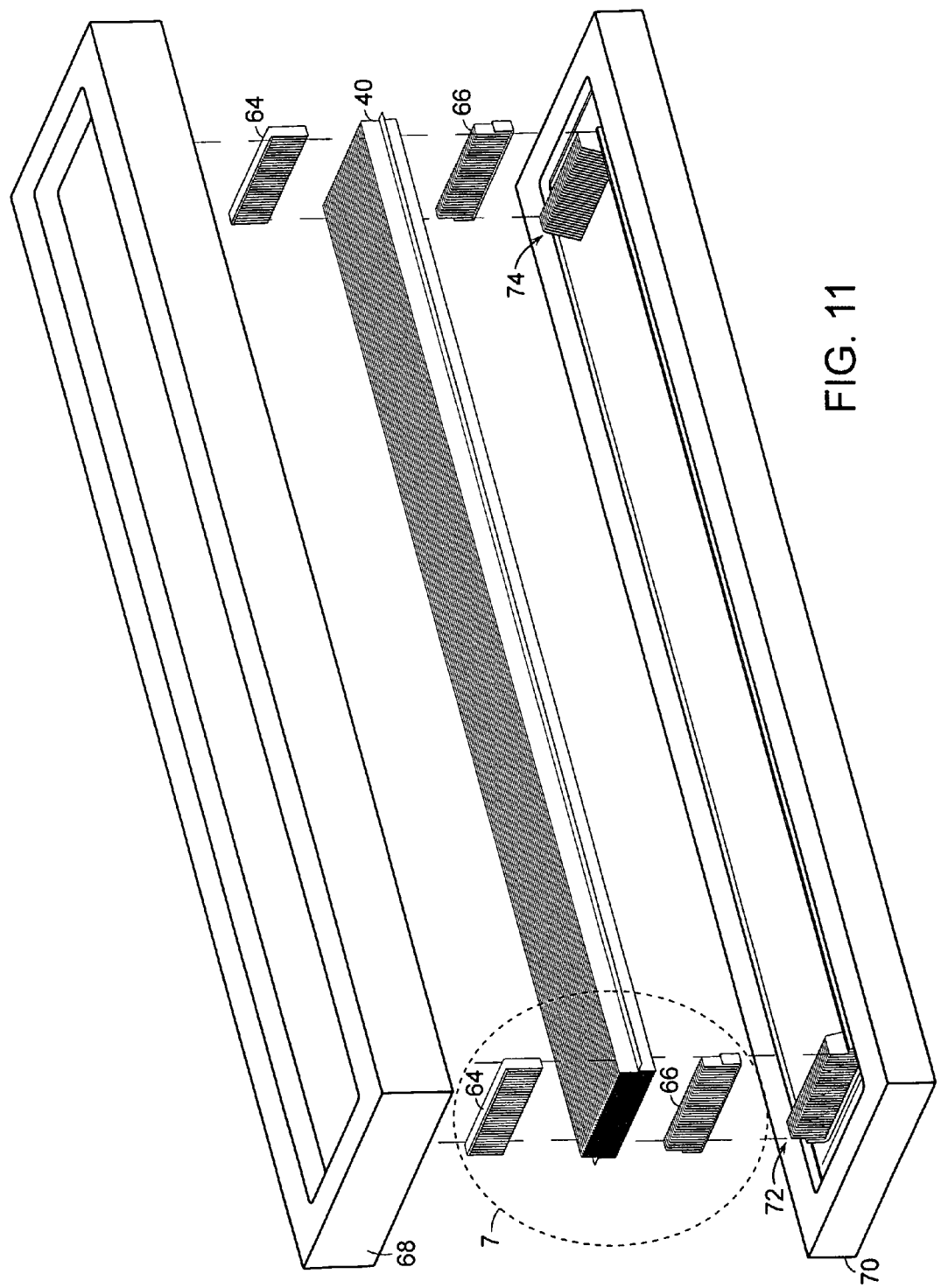
FIG. 11 is an exploded view of that module's divider member within a mold used to provide it with an over-molded gasket.

FIG. 11 depicts mold halves 68 and 70 that are used to mold the peripheral gasket onto the lower divider 40. That drawing's reference numerals 72 and 74 identify two sets of teeth that the lower mold half 70 forms. As will become apparent, the upper mold half 68 includes similar, complementary sets of teeth not seen in FIG. 11.

Figure 12:
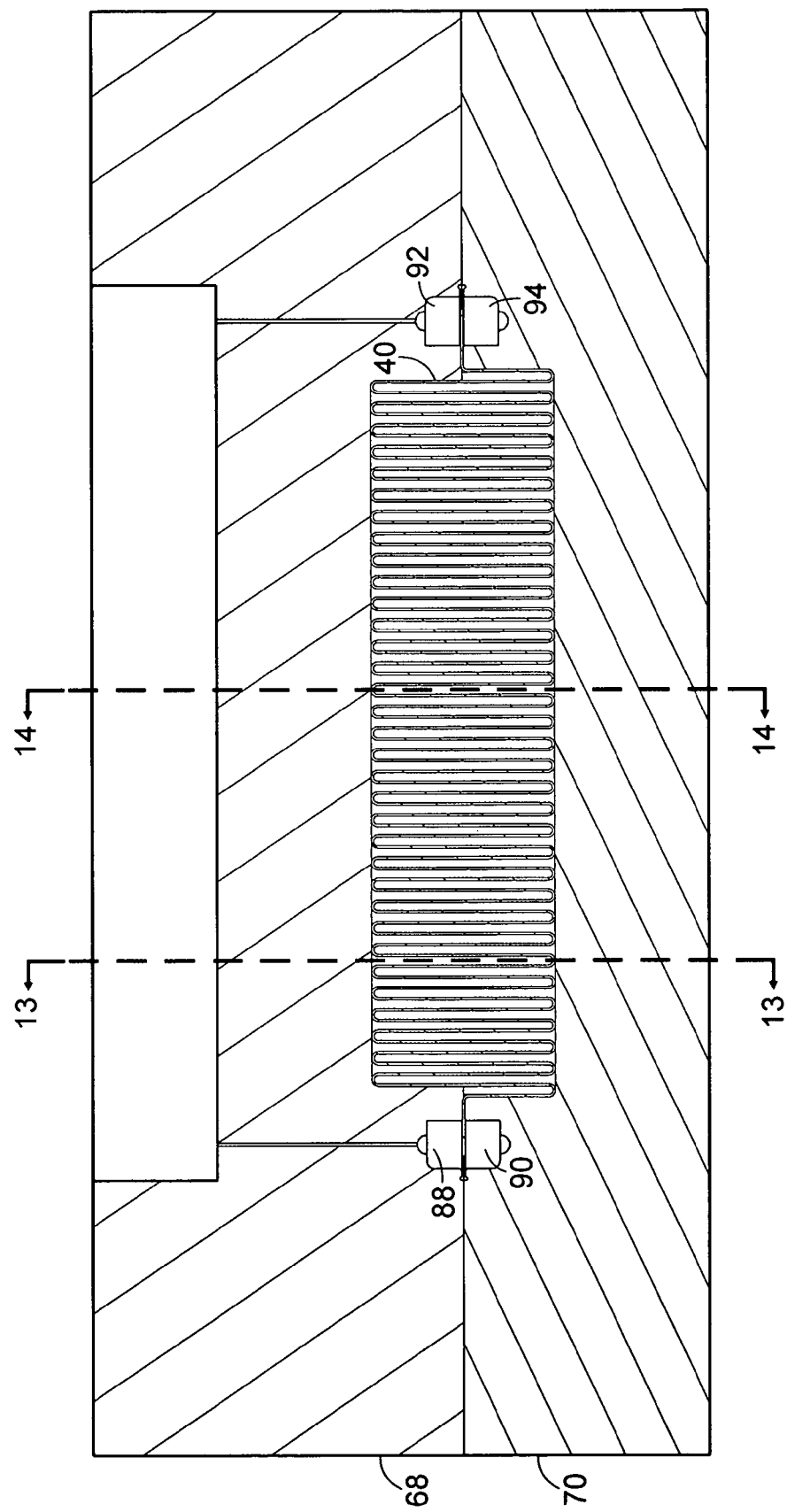
FIG. 12 is a cross-sectional view of the mold-and-divider assembly taken at line 12-12 of FIG. 14.

FIG. 12 is a cross section of the structure that results when the mold halves 68 and 70 are assembled onto the lower divider 40. FIG. 13, which is a cross section taken at FIG. 12's line 13-13, presents a view from within one of the upper, influent channels that the lower divider 40 defines. That view shows that teeth 76 and 78 provided by the upper mold half fit into that upper channel. Those teeth belong to sets of upper-mold-half teeth that together fit into all of the upper channels. FIG. 14, which is taken at FIG. 12's line 14-14 and presents a view from one of the lower, distillate channels defined by the lower divider 40, shows that teeth 80 and 82 respectively included in FIG. 11's lower-mold-half tooth sets 72 and 74 fit into that channel, as other teeth belonging to those sets fit into the other lower channels.

Figure 15:
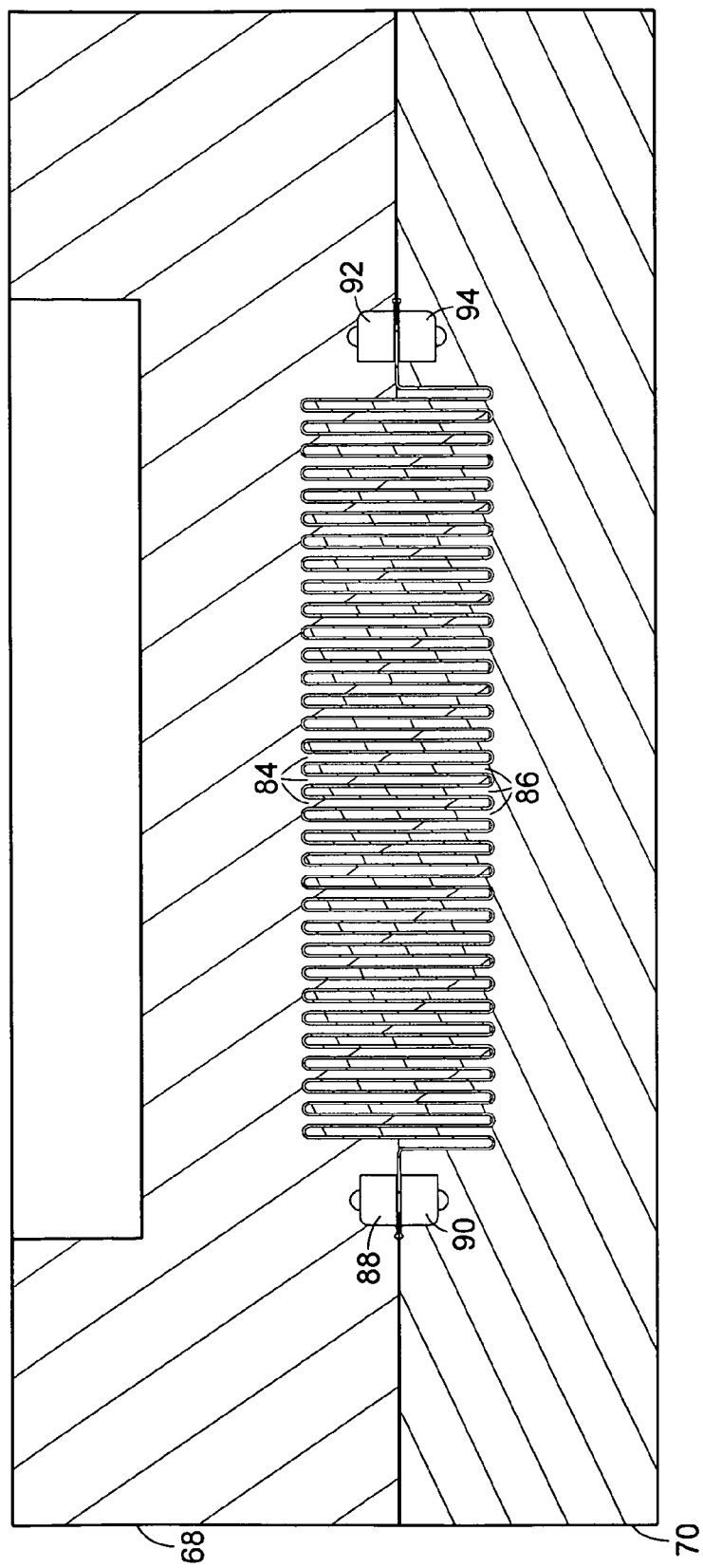
FIG. 15 is a cross-sectional view of the mold-and-divider assembly taken at line 15-15 of FIG. 14.

FIG. 15, which is a cross section taken at FIG. 14's line 15-15, further illustrates the mold teeth's placement; representative teeth 84 of one of the upper mold half's tooth sets are shown interdigitated with teeth 86 of one of the lower mold half's.

FIGS. 12 and 15 show the mold-cavity portions 88, 90, 92, and 94 that form the lower gasket 44's side rails identified in FIG. 6 by reference numeral 54, while FIGS. 13 and 14 show the mold-cavity portions 96, 98, 100, and 102 that form that gasket's end portions identified in FIG. 6 by reference numeral 56. Since the mold teeth fit in the channels that the lower divider 40 forms, they could be used by themselves to plug the divider channels and thereby prevent the molten rubber from flowing during the molding process from the mold's end cavity portions 96, 98, 100, and 102 inward along the distillate and influent channels; the comb members 64 and 66 could be dispensed with.

Without the combs, though, the molding process is much more difficult. The gasket material tends to stick to the teeth that plug the channels, and this would make it hard to extract the divider-and-gasket assembly from the mold if the mold teeth were what the gasket material stuck to. With the comb members, the gasket material instead sticks to the combs, which remain as part of the assembly being extracted, so extraction is much easier.

I have made the combs of a stiff liquid-crystal-polymer plastic; as was stated above, the combs help maintain the dividers' shapes, and plastic of such stiffness is helpful for that purpose. But the combs in other embodiments may be made of more-deformable material, such as the ethylene propylene diene monomer rubber of which the illustrated embodiment's gaskets are also made. Although this may to a degree compromise the combs' effectiveness in maintaining the dividers' shapes, it may allow some tolerance relaxation. Achieving an effective seal between the stainless-steel divider and the combs or the stainless-steel mold teeth and could require that those teeth's dimensions be held to tight tolerances. If combs 64 and 66 are made of deformable material, though, the pressure exerted against them by the molten rubber in the mold makes the combs' teeth so deform as to fill any gaps that tolerances leave. So tolerances may be relaxed on the combs and/or the mold teeth.

A similar approach is used to over-mold the upper heat-transfer assembly 34's gasket 42 onto its divider 38.

As FIG. 3 suggests, the cover plates 46 and 48 enclose the upper and lower heat-transfer assemblies 34 and 36, and fasteners not shown in the drawings clamp them against those assemblies. So the cover plates' sealing surfaces that FIG. 10's reference numerals 108 and 110 designate bear against gasket 44's peripheral sealing beads 112 and 114. As FIG. 8 shows, the influent inlet 22 admits influent into an influent inlet plenum 116, which feeds the influent channels. (The influent and distillate channels are identified in FIG. 4 by reference numerals 118 and 120, respectively.) The distillate channels 120 feed a distillate outlet plenum, identified in FIG. 8 by reference numeral 122, from which the distillate flows to the next counterflow-heat-exchanger module's distillate inlet port or to the system's distillate outlet (not shown). The cover plates 46 and 48 similarly form influent outlet and distillate inlet plenums at their other ends.

Figure 16:
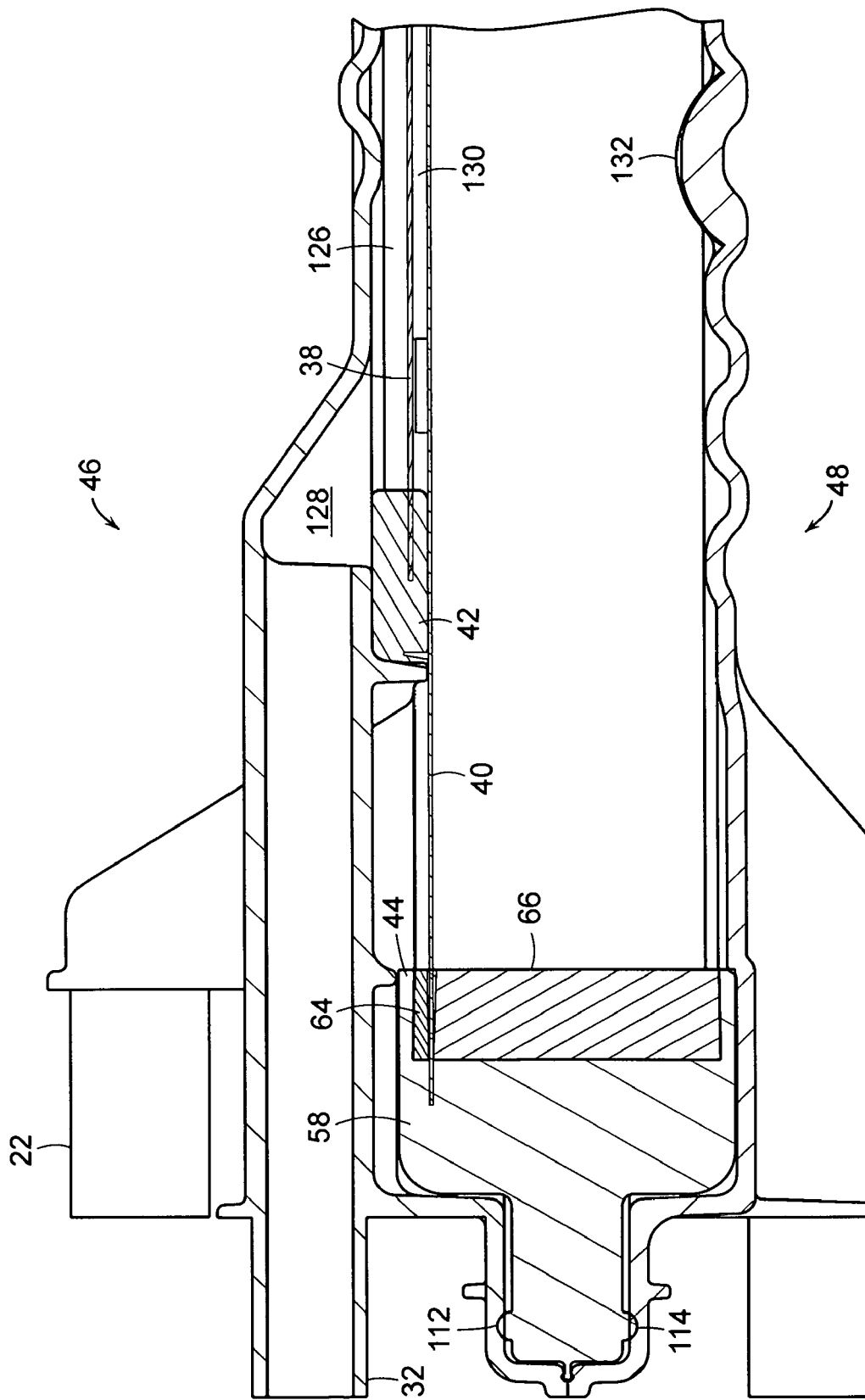
FIG. 16 is a cross-sectional view taken at line 16-16 of FIG. 9.

FIG. 16 is a cross-section taken at line 16-16 of FIG. 9. It shows that the concentrate outlet 32 communicates with the concentrate channels 126 though a concentrate outlet plenum 128 formed by the upper cover plate 46. The upper gasket 42 isolates the concentrate channels from the influent that flows in the space 130 between divider 38 and divider 40, through which heat flows from the concentrate to the influent.

As is seen best in FIG. 3, the cover plates 46 and 48 are corrugated for stiffness. To help the lower divider 40 maintain its channel spacing, the lower cover plate 48 also provides spacers 132, of which FIG. 17 provides a more-detailed view.

Employing the present inventions teachings greatly facilitates realizing the low-cost potential that recent design advances offer. It therefore constitutes a significant advance in the art.

What is claimed is:

1. A counterflow heat-exchanger module that forms a first inlet, a first outlet, a second inlet, and a second outlet and includes:
    A) complementary cover members that provide peripheral oppositely facing generally planar cover sealing surfaces that extend substantially parallel to a sealing plane, the cover members cooperating to enclose an interior chamber;
    B) a thermally conductive first divider that extends generally parallel to the sealing plane and divides the interior chamber into:
        i) a first conduit, by which liquid can flow from the first inlet to the first outlet in a first flow direction generally parallel to the sealing plane; and
        ii) a second conduit, through which liquid can flow from the second inlet to the second outlet in a second flow direction generally parallel to the sealing plane and opposite the first flow direction,
        the first divider providing thermal communication between liquids in the first and second conduits and being so convoluted as to extend beyond the cover sealing surfaces in a direction generally transverse to the sealing plane and the first and second flow directions and thereby form first and second channels that respectively belong to the first and second conduits and end in channel end openings; and
    C) a unitary gasket that so engages the first divider as to form a sealing ridge lying in the sealing plane and providing gasket sealing surfaces that mate with both of the cover sealing surfaces to seal the first conduit from the second conduit, the gasket further comprising integrally formed gasket plug portions that extend transversely of the sealing plane from the sealing ridge to plug the channel end openings.

2. A heat-exchanger module as defined in claim 1 wherein the gasket has been over-molded onto the first divider.

3. A heat-exchanger module as defined in claim 2 wherein the first divider is made predominantly of a material whose thermal conductivity is at least 2 W/m-K.

4. A heat-exchanger module as defined in claim 3 wherein the first divider is made predominantly of a material whose thermal conductivity exceeds 10 W/m-K.

5. A heat-exchanger module as defined in claim 2 wherein the gasket is deformable.

6. A heat-exchanger module as defined in claim 2 wherein the gasket is made predominantly of an elastomer.

7. A heat-exchanger module as defined in claim 2 wherein the area of the first divider's surface that borders the second conduit is at least 80% of the second conduit's total surface area.

8. A heat-exchanger module as defined in claim 1 wherein the first divider is made predominantly of a material whose thermal conductivity is at least 2 W/m-K.

9. A heat-exchanger module as defined in claim 8 wherein the area of the first divider's surface that borders the second conduit is at least 80% of the second conduit's total surface area.

10. A heat-exchanger module as defined in claim 1 wherein the area of the first divider's surface that borders the second conduit is at least 80% of the second conduit's total surface area.

11. A heat-exchanger module as defined in claim 10 wherein the gasket is deformable.

12. A heat-exchanger module as defined in claim 10 wherein the gasket is made predominantly of an elastomer.

13. A heat-exchanger module as defined in claim 1 wherein the gasket is deformable.

14. A heat-exchanger module as defined in claim 1 wherein the gasket is made predominantly of an elastomer.

15. A heat-exchanger module as defined in claim 1 further including a third inlet, a third outlet, and a second divider that is disposed in the interior chamber and cooperates with the cover members to divide from the first conduit a third conduit through which liquid can flow from the third inlet to the third outlet in a third flow direction generally parallel to the sealing plane and opposite the first flow direction.

* * * * *